US008329770B2

(12) United States Patent
Ziche et al.

(10) Patent No.: US 8,329,770 B2
(45) Date of Patent: Dec. 11, 2012

(54) SILICON-CONTAINING FOAMS

(75) Inventors: Wolfgang Ziche, Burghausen (DE); Volker Stanjek, Ampfing (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 313 days.

(21) Appl. No.: 12/675,295

(22) PCT Filed: Aug. 19, 2008

(86) PCT No.: PCT/EP2008/060848
§ 371 (c)(1),
(2), (4) Date: Feb. 25, 2010

(87) PCT Pub. No.: WO2009/027271
PCT Pub. Date: Mar. 5, 2009

(65) Prior Publication Data
US 2010/0305229 A1    Dec. 2, 2010

(30) Foreign Application Priority Data
Aug. 29, 2007   (DE) .......................... 10 2007 040 853

(51) Int. Cl.
*C08J 9/14*   (2006.01)
*C08G 18/12*   (2006.01)

(52) U.S. Cl. ........ 521/130; 521/131; 521/154; 521/182; 521/183; 528/25; 528/28

(58) Field of Classification Search .................. 521/130, 521/131, 154, 182, 183; 528/25, 28, 29
See application file for complete search history.

(56) References Cited

U.S. PATENT DOCUMENTS

| | | | |
|---|---|---|---|
| 5,512,650 | A | 4/1996 | Leir et al. |
| 7,060,760 | B2 | 6/2006 | Schindler et al. |
| 2004/0072921 | A1 | 4/2004 | Stanjek et al. |
| 2004/0204539 | A1 | 10/2004 | Schindler et al. |
| 2005/0131088 | A1 | 6/2005 | Stanjek et al. |
| 2008/0051482 | A1 | 2/2008 | Stanjek et al. |

FOREIGN PATENT DOCUMENTS

| | | |
|---|---|---|
| CN | 1501949 | 6/2004 |
| DE | 4108326 C1 | 9/1992 |
| EP | 0405494 A2 | 1/1991 |
| EP | 1421129 B1 | 6/2005 |
| WO | 03040103 A1 | 5/2003 |
| WO | 03080696 A1 | 10/2003 |

*Primary Examiner* — Irina S Zemel
(74) *Attorney, Agent, or Firm* — Brooks Kushman P.C.

(57) ABSTRACT

Silicone foams having good foam structure and rapid cure are produced from foamable mixtures containing a physical blowing agent and an organically modified organopolysiloxane containing at least one urea or urethane group and an alkoxy(alkyl)siloxy unit.

6 Claims, No Drawings

SILICON-CONTAINING FOAMS

CROSS-REFERENCE TO RELATED APPLICATION

This application is the U.S. national phase of PCT Appln. No. PCT/EP2008/060848 filed Aug. 19, 2008 which claims priority to German application DE 10 2007 040 853.8 filed Aug. 29, 2007.

BACKGROUND OF THE INVENTION

1. Field of the Invention

The invention relates to a foamable mixture containing an organically modified organopolysiloxane, processes for preparing the organopolysiloxane and foams which can be produced from the foamable mixtures.

2. Description of the Related Art

Both pure silicone foams and flexible polyurethane foams produced from organic polyols and diisocyanates or polyisocyanates have been known for a long time. However, both groups of materials have specific advantages and disadvantages. Thus, although silicone foams generally have a good high- and low-temperature stability and excellent flame resistance, they at the same time have a comparatively high density and an only very moderate mechanical property profile. Flexible polyurethane foams, on the other hand, usually have excellent mechanical properties. A disadvantage of many polyurethane foams is, however, burning behavior which is unsatisfactory for many applications and can be compensated, if at all, only by means of large amounts of added flame retardants.

The use of silicone-polyurethane copolymers, i.e. polysiloxanes which also contain polyurethane and/or urea units, makes it possible to develop new types of foams which have novel combinations of properties which can be tailored precisely to the respective application. Thus, foams which, in particular, have good mechanical properties in combination with a significantly improved burning behavior compared to conventional polyurethane foams can be produced in this way.

WO 03/080696 describes silicone foams which can be produced from particular hydroxyalkyl- and/or aminoalkyl-functional polysiloxanes and diisocyanates or polyisocyanates. Crosslinking of the silicones here occurs during foam formation. Water, which reacts with the isocyanates which are used in excess to liberate carbon dioxide and form urea units, serves as blowing agent.

WO 03/080696 describes two processes for producing foams. In one process, the hydroxyalkyl- and/or aminoalkyl-functional siloxane is firstly emulsified in water and the emulsion obtained is subsequently reacted with diisocyanates or polyisocyanates. In the second process, the hydroxyalkyl- and/or aminoalkyl-functional siloxane is firstly reacted with an excess of the diisocyanate or polyisocyanate to form an isocyanate-functional siloxane which is then mixed with water in a second process step and thereby foamed.

DE 41 08 326 C1 describes silicone foams which can be produced by reaction of hydroxyalkyl-functional polysiloxanes with diisocyanates or polyisocyanates. The siloxane foams are produced using methods comparable to those described in WO 03/080696.

In addition, the reaction of hydroxyalkyl- or aminoalkyl-terminated polysiloxanes with diisocyanates or polyisocyanates is known from further literature references, including U.S. Pat. No. 5,512,650 or WO 97/40103. However, this reaction has been described not for producing foams but exclusively for producing elastomers or prepolymers for hot melt adhesive or sealant applications. In addition, the compounds described there are, owing to their high molar masses and the very high viscosities associated therewith, unsuitable for use in a process for producing foams from prepolymers, in which crosslinking of the prepolymers is to occur only during foam formation and at low temperatures.

Disadvantages of all processes according to the prior art are the complex handling of multicomponent systems and the possible health hazards associated with the isocyanate content, which have to be ruled out by specific measures.

SUMMARY OF THE INVENTION

It was an object of the invention to develop siloxane copolymer foams which do not have this disadvantage of the prior art. These and other objects are provided by a foamable mixture (M) comprising A) organically modified organopolysiloxanes (S) which on average have at least one urethane or urea unit and also a group of the general formula [1]

where
R$^1$ is an alkyl, cycloalkyl, alkenyl or aryl radical having 1-20 carbon atoms,
R$^2$ is hydrogen, an alkyl radical which has 1-10 carbon atoms and in which up to 4 nonadjacent —CH$_2$— groups can be replaced by an —O— group or an acyl radical having 1-10 carbon atoms and
z is 0, 1 or 2,
per molecule and
B) a blowing agent (T).

DETAILED DESCRIPTION OF THE PREFERRED EMBODIMENTS

The mixtures (M) are employed for producing foams, preferably rigid or flexible foams, in particular flexible foams.

The polysiloxanes (S) in the foamable mixture (M) condense with one another in the presence of (atmospheric) moisture and cure, if appropriate with additives, to form solid, three-dimensionally crosslinked materials having good properties.

In a preferred embodiment of the invention, the organically modified organopolysiloxanes (S) have a group of the general formula [2]

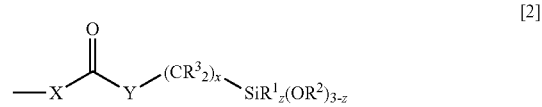

where
X and Y are each an oxygen atom, an N—R$^4$ group or a sulfur atom,
R$^3$ is hydrogen or an alkyl, cycloalkyl, alkenyl or aryl radical having 1-20 carbon atoms,
R$^4$ is a hydrogen atom, an alkyl, alkenyl or aryl radical having 1-10 carbon atoms or a —CH$_2$—SiR$^1_z$(OR$^2$)$_{3-z}$ group,
x is an integer from 1 to 8 and
R$^1$, R$^2$ and z are as defined for the general formula [1], with the proviso that at least one of the two groups X or Y is an NH function.

As radicals R$^1$, preference is given to radicals having 1-8 carbon atoms and particular preference is given to phenyl, methyl or ethyl groups. The radicals $R^2$ are preferably alkyl radicals having 1-8 carbon atoms, with ethyl or methyl groups being particularly preferred; the radicals $R^3$ are preferably hydrogen and preferred radicals $R^4$ are hydrogen, alkyl groups having 1-8 carbon atoms, in particular methyl, ethyl, propyl, cyclohexyl, cyclopentyl and phenyl radicals. x is preferably 1 or 3, with a value of 1 being particularly preferred. In the case of z, values of 0 or 1 are preferred.

If organically modified organopolysiloxanes (S) having groups of the general formula [2] in which $R^2$ is an alkyl group and x is 1 are present, these are α-alkoxysilyl-terminated organopolysiloxanes (S) in which the alkoxysilyl group is separated from the adjacent urethane or urea unit by only a methylene spacer. These α-alkoxysilyl groups have a dramatically increased reactivity toward (atmospheric) moisture compared to conventional alkoxysilyl functions without methylene spacers. This high reactivity makes the α-alkoxysilyl-terminated organopolysiloxanes particularly interesting for use in the foamable mixtures (M) since these materials cure particularly swiftly after foaming, as a result of which the foam structure is fixed and a foam having a good foam structure is obtained.

The polysiloxanes (S) are preferably linear or branched.

The blowing agents (T) are substances or mixtures of substances which are able to foam the mixture (M). They can be chemical blowing agents which undergo a chemical reaction during the foaming process to liberate gases by means of which the organopolysiloxanes (S) are foamed.

However, the blowing agents (T) are preferably physical blowing agents, i.e. gases which have been compressed under superatmospheric pressure to form liquids which when the mixture (M) is discharged from a pressure container vaporize either in their entirety or partly and thus foam the organopolysiloxanes (S). As an alternative, they can be liquids which vaporize at 0.10 MPa (abs.) and temperatures of <70° C., preferably at temperatures of <50° C., more preferably <40° C. In this case, foam formation occurs at appropriately increased temperatures at which the blowing agents vaporize and blow the foam.

Particularly preferred blowing agents (T) are the same gases which are also used for producing conventional sprayable in-situ foams and condense at relatively low pressures. Customary blowing agents are, for example, hydrocarbons having 1-5, in particular 3-5, carbon atoms, e.g. propane, butane or cyclopentane, fluorinated hydrocarbons having 1-3 carbon atoms, e.g. 1,1-difluoroethane or 1,1,1,2-tetrafluoroethane, carbon dioxide or dimethyl ether and also mixtures thereof.

The mixtures (M) preferably contain 0.5-60% by volume of blowing agents, with amounts of blowing agents of 2-40% by volume being preferred and amounts of blowing agents of 8-30% by volume being particularly preferred.

The foamable mixtures (M) comprising organo-polysiloxanes (S) and blowing agents (T) usually additionally contain further additives (Z), e.g. foam stabilizers, catalysts, fillers, thixotropes, diluents, solvents, fillers, further polymers, flame retardants, UV absorbers, free-radical scavengers, etc.

The organopolysiloxanes (S) are preferably prepared from the following components:

A1) organopolysiloxanes (S1) having at least one group selected from among an aminoalkyl group and a hydroxyalkyl group per molecule, and A2) isocyanatoalkylalkoxysilanes (V1).

If appropriate, a catalyst (K) can be present as component A3) during the preparation.

The preparation is preferably carried out by simple combining of the components in a continuous or discontinuous process. If appropriate, an isocyanate-reactive component, e.g. an alcohol such as ethanol or methanol, can be added at the end of the reaction in order to scavenge excess isocyanatosilane, so that an isocyanate-free product is obtained. In the continuous process, the two components are preferably mixed continuously in a mixer and can subsequently react with one another. This reaction can advantageously be carried out, for example, in a shell-and-tube reactor.

Preference is likewise given to preparing the polysiloxanes (S) from the following components:

A1) organopolysiloxanes (S1) having at least one group selected from among an aminoalkyl group and a hydroxyalkyl group per molecule, A2) alkoxysilanes (V2) having NCO-reactive groups and A3) polyisocyanates (J) having at least 2 isocyanate groups per molecule.

If appropriate, a catalyst (K) can be present as component A4) during the preparation.

The NCO-reactive groups of the alkoxysilanes (V2) are preferably OH, SH or N—$R^4$ groups, where $R^4$ is as defined for the general formula [2]. Groups of the formula N—$R^4$ are particularly preferred.

The following process is particularly preferred: the organopolysiloxanes (S1) are, optionally in the presence of a solvent (L), reacted with an excess of polyisocyanates (J) having at least 2 isocyanate groups per molecule to form isocyanate-functional siloxanes. Here, the polyisocyanate is preferably used in excess, preferably in an excess of from 1.2 to 10 mol of isocyanate units per mol of aminoalkyl or hydroxyalkyl groups of the organopolysiloxanes (S1) and most preferably in excesses of from 1.5 to 3 mol. In this first reaction step, all amino and/or hydroxy groups of the siloxanes (S1) then react completely, resulting in a mixture which contains not only the isocyanate-functional siloxanes but also proportions of unreacted polyisocyanates (J). The excess isocyanate groups of the isocyanate-functional siloxanes and of the unreacted polyisocyanates (J) are then reacted with aminoalkylalkoxysilanes (V2) to form the alkoxysilyl-functional organopolysiloxanes (S). In the latter reaction step, preference is given to using from 0.9 to 1.5 molar equivalents of aminoalkylalkoxysilanes (V2) based on the excess isocyanate groups. If the synthesis has been carried out in the presence of a solvent (L), this can subsequently be completely or partly removed by distillation.

In addition, the following procedure is particularly preferred: the organopolysiloxanes (S1) and the amino-alkylalkoxysilanes (V2) are firstly mixed and subsequently, optionally in the presence of a solvent (L), reacted with the polyisocyanates (J) having at least 2 isocyanate groups per molecule to form the alkoxysilyl-functional organopolysiloxanes (S). Here, the amounts of the reactants are preferably selected so that from 0.9 to 1.1 mol of NCO groups are used per mol of NCO-reactive groups. The solvent (L) can subsequently be completely or partly removed by distillation.

These preparative processes can also be carried out batchwise or continuously. Preference is given to continuous, solvent-free processes which can be carried out, for example, by means of extruders.

The blowing agents (T) and also the abovementioned additives (Z) can be added to the siloxanes (S) at any point in time before, during or after synthesis of the latter.

The organopolysiloxanes (S1) are preferably linear or branched. As organopolysiloxanes (S1), preference is given to using siloxanes whose aminoalkyl or hydroxyalkyl groups have the general formula [3]

$$—O—(SiR^5R^6)—R^7—Z \qquad [3]$$

where $R^5$ is a monovalent $C_1$-$C_{12}$-hydrocarbon radical which may be substituted by —CN or halogen and in which one or more, nonadjacent methylene units may be replaced by —O— or $NR^{11}$ groups, or a phenyl radical which may be substituted by $C_1$-$C_6$-alkyl radicals, —CN or halogen, $R^6$ is a hydrogen atom or a radical $R^5$, $R^7$ is a divalent, optionally cyano-, alkyl-, hydroxy-, amino-, aminoalkyl-, hydroxyalkyl- or halogen-substituted $C_1$-$C_{12}$-hydrocarbon radical in which one or more, nonadjacent methylene units may be replaced by —O— or $NR^{12}$ groups, $R^{11}$, $R^{12}$ are each hydrogen or an alkyl, cycloalkyl, alkenyl or aryl radical having 1-20 carbon atoms, and Z is an OH or $NH_2$ group.

As radicals $R^5$, preference is given to using unbranched alkyl groups, preferably having from 1 to 6 carbon atoms, or aromatic hydrocarbons. Methyl groups in particular are particularly preferred radicals $R^5$. Radicals $R^6$ are preferably unsubstituted. Preferred radicals $R^7$ are, in particular, linear alkylene chains having from 1 to 6, preferably 1 or 3, carbon atoms or cyclic hydrocarbon radicals. In addition, radicals $R^7$ which are likewise preferred are alkylene chains which have from 1 to 10 carbon atoms, preferably 3 or 5 carbon atoms, and whose carbon chain is interrupted by one or more oxygen atoms or an $NR^8$ group. As radicals $R^8$, preference is given to hydrogen, alkyl groups, aryl groups, aminoalkyl groups or hydroxyalkyl groups, preferably each having from 1 to 6 carbon atoms, with hydrogen and methyl groups being particularly preferred. The group Z is particularly preferably an amine function.

Preference is given to using branched or unbranched organopolysiloxanes (S1) which have at least 90%, in particular at least 95%, of their chain ends terminated by aminoalkyl or hydroxyalkyl groups of the general formula [3]. It is possible, if appropriate, for both aminoalkyl and hydroxyalkyl groups of the general formula [3] to be present on an organopolysiloxane molecule (Si).

Particular preference is given to using organopolysiloxanes (S1) which either consist exclusively of or comprise at least 50% by weight, preferably at least 70% by weight, particularly preferably at least 90% by weight, of linear siloxanes of the general formula [4]

$$Z-R^7-[-SiR^5R^6O-]_m-SiR^5R^6-R^7-Z \quad [4]$$

where m is an integer having an average value in the range from 1 to 10,000 and $R^5$, $R^6$, $R^7$ and Z are as defined above.

Preferred average values of m are from 10 to 2000, with particular preference being given to average values of from 15 to 1000, in particular from 30 to 800.

In a preferred embodiment of the invention, the siloxanes (S1) of the general formula [4] are mixed with further siloxanes (S1) which have an average of more than two groups selected from among aminoalkyl functions and hydroxyalkyl functions. These can be either branched siloxanes (S1) terminated by groups selected from among aminoalkyl functions and hydroxy-alkyl functions or unbranched siloxanes having lateral groups selected from among aminoalkyl functions and hydroxyalkyl functions.

In a particularly preferred process, the linear organopolysiloxanes (S1) of the general formula [4] are prepared from organopolysiloxanes of the general formula [5]

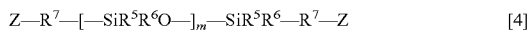

and organosilicon compounds of the general formulae [6] to [8]

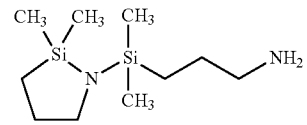

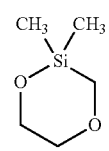

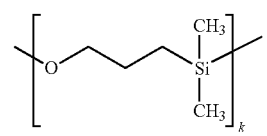

where k is an integer of at least 2 and $R^5$ and m are as defined above.

In one embodiment of the invention, siloxanes having phosphonatoalkyl functions of the formula [9]

$$-R^9-P(O)(OR^{10})_2 \quad [9]$$

where $R^9$ has one of the meanings of $R^7$ and $R^{10}$ has one of the meanings of $R^5$, are used in addition to the aminoalkyl and/or hydroxyalkyl functions as component (S1). The phosphate functions can improve the adhesion of the foams to metal surfaces.

The siloxanes (S1) used in the process of the invention preferably have a very small proportion of siloxanes which are not reactive toward isocyanates. In particular, they preferably have a very low proportion of cyclic siloxanes which are not reactive with isocyanates. Thus, unreactive siloxanes may act as antifoams and thus adversely affect the foam structure of the cured foams. It may be advantageous to remove cyclic siloxanes which are not reactive towards isocyanates from the siloxanes (S1) by distillation before the siloxanes (S1) are used in the process.

As polyisocyanates (J), it is possible to use all known diisocyanates or polyisocyanates. Preference is given to using polyisocyanates (J) of the general formula [10]

$$Q(NCO)_n \quad [10]$$

where

Q is an n-functional aromatic or aliphatic hydrocarbon radical and n is an integer of at least 2.

Q preferably has from 4 to 30 carbon atoms. n is preferably an integer of not more than 5. Examples of diisocyanates (J) which can be used are diisocyanatodiphenylmethane (MDI), both in the form of crude or technical-grade MDI and in the form of pure 4,4' or 2,4' isomers or compositions in which they are present, tolylene diisocyanate (TDI) in the form of its various regioisomers, diisocyanatonaphthalene (NDI), isophorone diisocyanate (IPDI), 1,3-bis(1-isocyanato-1-methylethyl)benzene (TMXDI), methylenedicyclohexylene 4,4'-diisocyanate (H-MDI) or hexamethylene diisocyanate (HDI). Examples of polyisocyanates (J) are polymeric MDI (p-MDI), triphenylmethane triisocyanate or biuret or isocyanurate trimers of the abovementioned isocyanates. The diisocyanates and/or polyisocyanates (J) can be used either alone or in admixture with one another.

As alkoxysilanes (V1) or (V2), preference is given to using silanes of the general formulae [11] or [12]

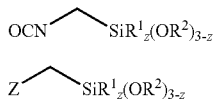

where

Z is an OH, SH or NHR$^{13}$ group and

R$^{13}$ is hydrogen or an alkyl, cycloalkyl, alkenyl or aryl radical having 1-20 carbon atoms and R$^1$, R$^2$, Z and z are as defined above.

In the preparation of the organosiloxanes (S), it is possible for not only the siloxanes (S1), the aminoalkylalkoxysilanes (V1) or (V2) and the polyisocyanates (J) but also further components having isocyanate functions and/or isocyanate-reactive groups to be used and concomitantly be incorporated into the organosiloxanes (S). Examples which may be mentioned here are monoisocyanates, isocyanate-functional organic oligomers or (pre)polymers, monomeric alcohols, monomeric diols such as glycol, propanediol, butanediol, monomeric oligools such as pentaerythritol or trihydroxymethylethane, oligomeric or polymeric alcohols having one, two or more hydroxyl groups, e.g. polyethylene oxides or polypropylene oxides, water, monomeric amines having one, two or more amine functions, e.g. ethylenediamine, hexamethylenediamine, and also oligomeric or polymeric amines having one, two or more amine functions. The proportion by weight of these additional compounds is typically less than 30% by weight, preferably less than 15% by weight and most preferably less than 5% by weight, based on the isocyanate-functional organosiloxanes (S1).

The preparation of the siloxanes (S) can be accelerated by use of catalysts (K). As catalysts (K), preference is given to using acidic or basic compounds, e.g. partially esterified phosphoric acids, carboxylic acids, partially esterified carboxylic acids, alkylammonium hydroxides, ammonium alkoxides, alkylammonium fluorides or amine bases, organotin compounds, organozinc compounds, organobismuth compounds, organotitanium compounds or mixtures of these catalysts. If appropriate, the catalysts (K) used are deactivated after the reaction is complete, e.g. by addition of catalyst poisons or, in the case of acidic or basic catalysts (K), by neutralization. This deactivation can improve the storage stability of the siloxanes (S) or the mixtures (M) in which they are present. As stated, foamable mixtures (M) can contain further additives (Z). A preferred additive is fillers (F). Here, it is possible to use all nonreinforcing fillers, i.e. fillers having a BET surface area of up to 50 m$^2$/g, e.g. chalk, or reinforcement fillers, i.e. fillers having a BET surface area of at least 50 m$^2$/g, e.g. carbon black, precipitated silica or pyrogenic silica. In particular, both hydrophobic and hydrophilic pyrogenic silicas are preferred fillers. In a particularly preferred embodiment of the invention, a pyrogenic silica whose surface has been modified with hydroxyalkyl or in particular aminoalkyl functions is used. This modified silica can be chemically built into the foam polymer. The fillers (F) can perform various functions. Thus, they can be used for adjusting the viscosity of the foamable mixture (M). In particular, however, they can perform a "support function" during foaming and thus lead to foams having a better foam structure. Finally, the mechanical properties of the resulting foams can also be improved significantly by the use of fillers (F).

Furthermore, the foamable mixtures (M) can also contain catalysts (K2) which accelerate the silane condensation reaction and thus accelerate curing of the foam. Suitable catalysts (K2) are, inter alia, organotin compounds. Examples are dibutyltin dilaurate, dioctyltin dilaurate, dibutyltin diacetate, dibutyltin dioctoate and dibutyltin bis(dodecylmercaptide). In addition, it is also possible to use tin-free catalysts (K2), e.g. organic titanates, iron catalysts such as organic iron compounds, organic and inorganic heavy metal compounds or amines. An example of an organic iron compound is iron(III) acetylacetonate. Examples of amines are triethylamine, tributylamine, 1,4-diazabicyclo[2.2.2]octane, N,N-bis(N,N-dimethyl-2-aminoethyl)methylamine, N,N-dimethylcyclohexylamine, N,N-dimethylphenylamine, bis(N,N-dimethylaminoethyl) ether, N,N-dimethyl-2-aminoethanol, N, N-dimethylamino-pyridine, N,N,N,N-tetramethylbis(2-aminoethyl)methyl-amine, 1,5-diazabicyclo[4.3.0]non-5-ene, 1,8-diazabicyclo[5.4.0]undec-7-ene, N-ethylmorpholine and N,N'-dimethylaminopyridine.

The catalysts (K2) can be used individually or as a mixture. The catalysts (K) used in the preparation of the siloxanes (S) may at the same time also serve as catalysts (K2) for curing of the foam.

Based on the foamable mixture (M), the catalyst (K$_2$) is preferably used in an amount of 0.03 6.0% by weight, more preferably in an amount of 0.1 4.0% by weight.

In many cases, it is advantageous to add foam stabilizers (ST) to the foamable mixtures (M). Suitable foam stabilizers (ST) which may be used are, for example, the commercial silicone oligomers modified by polyether side chains, or fluorine surfactants, such as Zonyl® types (DuPont). The foam stabilizers are used in amounts of up to 6% by weight, preferably from 0.1 to 3% by weight, in each case based on the foamable mixtures (M).

Furthermore, the addition of cell regulators, thixotropes and/or plasticizers can be advantageous. To improve the fire resistance further, flame retardants, e.g. phosphorus-containing compounds, especially phosphates (e.g. triethyl phosphate, trischloropropyl phosphate etc.) and phosphonates, and also halogenated polyesters and polyols or chloroparaffins, can additionally be added to the foamable mixtures (M).

The organopolysiloxanes (S) or the foamable mixtures (M) containing these are preferably used for producing siloxane-polyurethane copolymer foams or siloxane-polyurea copolymer foams. The siloxanes (S) or foamable mixtures (M) are used in the form of 1-component systems. Foam formation is effected here by means of the physical blowing agent (T). After application of the foam, it cures by reaction with atmospheric moisture.

All the above symbols in the above formulae have their meanings independently of one another in each case. In all formulae, the silicon atom is tetravalent.

Unless indicated otherwise, all amounts and percentages are by weight, all pressures are 0.10 MPa (abs.) and all temperatures are 20° C.

EXAMPLES

Example 1

200 g of a linear organopolysiloxane of the formula H$_2$N—(CH$_2$)$_3$—[(CH$_3$)$_2$—SiO]$_{129}$Si(CH$_3$)$_2$—(CH$_2$)$_3$—NH$_2$ and 44.9 g of phenylaminomethyltrimethoxysilane were reacted in 50 ml of absolute tetrahydrofuran (THF) with 20.62 g of tolylene diisocyanate (TDI) over a period of 30 minutes, with a total of 250 g of THF being added a little at a time and the mixture being heated to 50° C. The solution obtained in this way was freed of the solvent under reduced pressure.

Example 2

55.13 g of the prepolymer of Example 1 and 0.5 g of DBTL were placed in a glass pressure bottle with valve and 20 ml of dimethyl ether (DME) were introduced. The mixture was homogenized by shaking for 12 hours. The mixture could be processed to give a foam bead which did not flow apart but was immediately tack-free and had good stability and ultimate tensile strength. The pore sizes were uniform.

Example 3

200 g of a linear organopolysiloxane of the formula $H_2N-(CH_2)_3-[(CH_3)_2-SiO]_{129}Si(CH_3)_2-(CH_2)_3-NH_2$ were reacted in a mixture of 12.5 g of methyl ethyl ketone (MEK) and 250 g of THF with 20.62 g of tolylene diisocyanate (TDI) over a period of 30 minutes, with the temperature rising to 34° C. 44.9 g of phenylaminomethyl-trimethoxysilane were then added. The viscous solution is still stirrable. THF/MEK is subsequently removed at 300 mbar.

Example 4

50.3 g of the prepolymer of Example 3 and 0.5 g of DBTL were placed in a glass pressure bottle with valve and 10 ml of dimethyl ether (DME) and 10 ml of a 1:2 mixture of propane/butane were introduced. The mixture was homogenized by shaking for 12 hours. The mixture could be sprayed to give a foam which did not flow apart and had a skin formation time of less than one minute. The vulcanized foam had good stability and ultimate tensile strength. The pore sizes were uniform.

Example 5

200 g of a linear organopolysiloxane of the formula $H_2N-(CH_2)_3-[(CH_3)_2-SiO]_{200}Si(CH_3)_2-(CH_2)_3-NH_2$ and 44.9 g of phenylaminomethyltrimethoxysilane were reacted in a mixture of 12.5 g of methyl ethyl ketone (MEK) and 250 g of THF with 20.62 g of tolylene diisocyanate (TDI) over a period of 30 minutes, with the temperature rising to 34° C. The viscous solution was still stirrable. THF/MEK was subsequently removed at 300 mbar and a tough rubber-like material was obtained.

Example 6

50.3 g of the prepolymer of Example 5 and 0.5 g of DBTL were placed in a glass pressure bottle with valve and 25 ml of dimethyl ether (DME) were introduced. The mixture was homogenized by shaking for 12 hours. The mixture could be sprayed to give a foam which did not flow apart and had a skin formation time of less than one minute. The vulcanized foam has good stability and ultimate tensile strength. The pore sizes were uniform.

Example 7

1173 g of a linear organopolysiloxane of the formula $H_2N-(CH_2)_3-[(CH_3)_2-SiO]_{620}Si(CH_3)_2-(CH_2)_3-NH_2$ were reacted with 10.21 g of $H_2N-(CH_2)_3-[(CH_3)_2-Si-cyclo(N-(CH_2)_3-[(CH_3)_2-Si)$ to form a linear organopolysiloxane of the formula $H_2N-(CH_2)_3-[(CH_3)_2-SiO]_{620}Si(CH_3)_2-(CH_2)_3-NH_2$. 200 g of this linear organopolysiloxane of the formula $H_2N-(CH_2)_3-[(CH_3)_2-SiO]_{620}Si(CH_3)_2-(CH_2)_3-NH_2$ and 18 g of phenylaminomethyltrimethoxysilane were reacted in 300 g of THF with 8.3 g of tolylene diisocyanate (TDI) over a period of 30 minutes, with a total of 100 g of additional THF being added a little at a time and the temperature rising to 34° C. The viscous solution was still stirrable. THF was subsequently removed at 300 mbar and a tough rubber-like material was obtained.

Example 8

50.0 g of the prepolymer from Example 7 and 0.25 g of DBTL were placed in a glass pressure bottle with valve and 20 ml of dimethyl ether (DME) and 30 ml of a 1:1 mixture of propane/butane were introduced. The mixture was homogenized by shaking for 12 hours. The mixture could be sprayed to give a foam which did not flow apart and had a skin formation time of less than one minute. The vulcanized foam has good stability and ultimate tensile strength. The pore sizes were uniform.

Example 9

200 g of a linear organopolysiloxane of the formula $HO-(CH_2)_2-O-CH_2-[(CH_3)_2-SiO]_{620}Si(CH_3)_2-CH_2-O-(CH_2)_2-OH$ were heated together with 8.3 g of tolylene diisocyanate (TDI) and 40 mg of Borchi® Kat 0244 (Borchers GmbH) in 300 g of THF under reflux for 1 hour. The mixture was then reacted with 18 g of phenylaminomethyltrimethoxysilane over a period of 30 minutes, with a total of 100 g of additional THF being added a little at a time. The viscous solution was still stirrable. THF was subsequently removed at 300 mbar and a tough rubber-like material was obtained.

Example 10

50.0 g of the prepolymer from Example 9 and 0.25 g of DBTL were placed in a glass pressure bottle with valve and 15 ml of dimethyl ether (DME) and 35 ml of a 1:1 mixture of propane/butane were introduced. The mixture was homogenized by shaking for 12 hours. The mixture could be sprayed to give a foam which did not flow apart and had a skin formation time of less than one minute. The vulcanized foam has good stability and ultimate tensile strength. The pore sizes were uniform.

Example 11

200 g of a linear organopolysiloxane of the formula $H_2N-(CH_2)_3-[(CH_3)_2-SiO]_{129}Si(CH_3)_2-(CH_2)_3-NH_2$ and 3.3 g of isocyanatomethyltrimethoxysilane were reacted in 250 ml of absolute tetrahydrofuran (THF) over a period of 30 minutes. The solution obtained in this way was freed of the solvent under reduced pressure.

Example 12

60 g of the prepolymer from Example 11 were placed in a glass pressure bottle with valve and 30 ml of dimethyl ether (DME) were introduced. The mixture was homogenized by shaking for 12 hours. The mixture could be processed to give a foam bead which did not flow apart and was immediately tack-free and had good stability and ultimate tensile strength. The pore sizes were uniform.

The invention claimed is:

1. A foamable mixture (M) comprising:
A) organically modified organopolysiloxanes (S) which are prepared from
A1) organopolysiloxanes (S1) having at least one group selected from among an aminoalkyl group and a hydroxyalkyl group per molecule,
A2) alkoxysilanes (V2) having NCO-reactive groups and,
A3) polyisocyanates (J) having at least 2 isocyanate groups per molecule and which on average have at least one urethane or urea unit and also a group of the general formula [1]

—SiR$^1$$_z$(OR$^2$)$_{3-z}$  [1]

where
R$^1$ is an alkyl, cycloalkyl, alkenyl or aryl radical having 1-20 carbon atoms,
R$^2$ is hydrogen, an alkyl radical which has 1-10 carbon atoms and in which up to 4 nonadjacent —CH$_2$— groups can be replaced by an —O— group or an acyl radical having 1-10 carbon atoms, and
z is 0, 1 or 2, per molecule, and
B) a blowing agent (T).

2. The foamable mixture (M) of claim 1, wherein the organically modified organopolysiloxane (S) has a group of the formula [2]

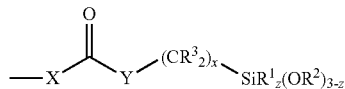  [2]

where
X and Y are each an oxygen atom, an N—R$^4$ group or a sulfur atom,
R$^3$ is hydrogen or an alkyl, cycloalkyl, alkenyl or aryl radical having 1-20 carbon atoms,
R$^4$ is a hydrogen atom, an alkyl, alkenyl or aryl radical having 1-10 carbon atoms or a —CH$_2$—SiR$^1$$_z$(OR$^2$)$_{3-z}$ group,
x is an integer from 1 to 8 and
with the proviso that at least one of the two groups X or Y is an NH function.

3. The foamable mixture (M) of claim 1 wherein the blowing agent (T) is a physical blowing agent selected from the group consisting of gases compressed under superatmospheric pressure to form liquids and liquids which vaporize at 0.10 MPa (abs.) and temperatures of <70° C.

4. The foamable mixture (M) of claim 3 wherein organopolysiloxanes (S1) are used whose aminoalkyl or hydroxyalkyl groups have the formula [3]

—O—(SiR$^5$R$^6$)—R$^7$—Z  [3]

where
R$^5$ is a monovalent C$_1$-C$_{12}$-hydrocarbon radical optionally substituted by —CN or halogen and in which one or more, nonadjacent methylene units are optionally replaced by —O— or NR$^{11}$ groups, or a phenyl radical optionally substituted by C$_1$-C$_6$-alkyl radicals, CN or halogen,
R$^6$ is a hydrogen atom or a radical R$^5$,
R$^7$ is a divalent, optionally cyano-, alkyl-, hydroxy, amino-, aminoalkyl-, hydroxyalkyl- or halogen-substituted C$_1$-C$_{12}$-hydrocarbon radical in which one or more, nonadjacent methylene units are optionally replaced by —O— or NR$^{12}$ groups,
R$^{11}$, R$^{12}$ are each hydrogen or an alkyl, cycloalkyl, alkenyl or aryl radical having 1-20 carbon atoms, and
Z is an OH or NH$_2$ group.

5. The foamable mixture (M) of claim 2, wherein the blowing agent (T) is a physical blowing agent selected from the group consisting of gases compressed under superatmospheric pressure to form liquids and liquids which vaporize at 0.10 MPa (abs.) and temperatures of <70° C.

6. A foam produced from the foamable mixture of claim 1.

* * * * *